United States Patent [19]

Feldtkeller

[11] Patent Number: 4,908,755
[45] Date of Patent: Mar. 13, 1990

[54] METHOD AND CIRCUIT FOR LIMITING THE OUTPUT CURRENT OF A FLYBACK CONVERTER

[75] Inventor: Martin Feldtkeller, Munich, Fed. Rep. of Germany

[73] Assignee: Siemens Aktiengesellschaft, Munich, Fed. Rep. of Germany

[21] Appl. No.: 328,962

[22] Filed: Mar. 27, 1989

[30] Foreign Application Priority Data

Mar. 25, 1988 [DE] Fed. Rep. of Germany ....... 3810224

[51] Int. Cl.$^4$ ............................................. H02M 3/335
[52] U.S. Cl. ....................................... 363/56; 363/19; 363/21
[58] Field of Search ............................ 363/19, 21, 56

[56] References Cited

U.S. PATENT DOCUMENTS 4,291,367 9/1981 Haas ....................................... 363/21

FOREIGN PATENT DOCUMENTS 247687 12/1987 European Pat. Off. .
3112377 1/1983 Fed. Rep. of Germany .
2431216 2/1980 France .
63618 5/1981 Japan ..................................... 363/21

Primary Examiner—William H. Beha, Jr.
Attorney, Agent, or Firm—Herbert L. Lerner; Laurence A. Greenberg

[57] ABSTRACT

A method and circuit for limiting the output current of a power supply with a self oscillating flyback converter, controls a primary peak current as a function of input and output voltages of the flyback converter. A quotient is formed from two given input variables and multiplied by a first constant. A second constant is added thereto and then multiplied by a third constant. The two input variables are defined by the input and output voltage of the flyback converter. The output voltage of the flyback converter is divided by the input voltage of the flyback converter in the quotient formation. The output variable is provided as a manipulated variable for controlling the primary peak current. The three constants are dimensioned for simulating a formal dependency existing in the flyback converter between the input and output voltages and the primary peak current of the flyback converter.

6 Claims, 1 Drawing Sheet

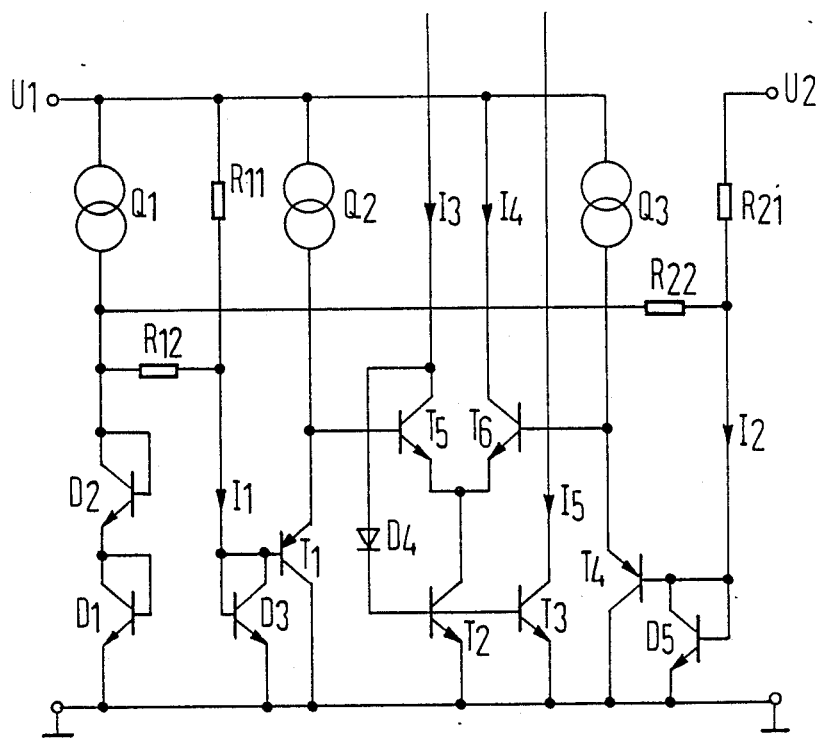

METHOD AND CIRCUIT FOR LIMITING THE OUTPUT CURRENT OF A FLYBACK CONVERTER

The invention relates to a method and circuit for limiting the output current of a power supply with a self oscillating flyback converter, by controlling a primary peak current as a function of input and output voltages of the flyback converter.

The current/voltage characteristic of a power supply can be divided into two ranges: the stabilization range and the overload range. While on one hand, an output voltage that is independent of the load current is sought in the stabilization range, on the other hand the overload range is typically constructed as a current limitation.

A power supply operating according to the principle of a self oscillating flyback converter emits an output current $I_A$ in the overload range that is dependent on the input voltage $U_E$, the output voltage $U_A$, the turns ratio of the transformer and the primary peak current $I_p$. In terms of a formula, this relationship can be described as follows:

$$I_A = ü I_p/2 \cdot U_E/(U_E + u \cdot U_A) \qquad (1)$$

Decisive factors in this case are a marked dependency of the output current $I_A$ on the input voltage $U_E$ and a relatively high short-circuit current.

In order to counteract this, two separate regulation means, which are known, for example, from U.S. Pat. No. 4,291,367, provide for a reduction of the primary peak current both with decreasing output voltage and with increasing input voltage.

In this process, particularly at low input voltages, an inadequate short-circuit limitation makes itself felt because of control ranges that mutually interfere with one another.

It is accordingly an object of the invention to provide a method for limiting the output current of a power supply and a circuit for performing the method, which overcome the hereinafore-mentioned disadvantages of the heretofore-known methods and devices of this general type, and which provide adequate limitation of the output current of a self oscillating flyback converter in all operating states.

With the foregoing and other objects in view there is provided, in accordance with the invention, a method for limiting the output current of a power supply with a self oscillating flyback converter, by controlling a primary peak current as a function of input and output voltages of the flyback converter, which comprises forming a quotient from two given input variables and multiplying the quotient by a first constant, adding a second constant thereto and then multiplying by a third constant; defining the two input variables by the input and output voltage of the flyback converter; dividing the output voltage of the flyback converter by the input voltage of the flyback converter in the quotient formation; providing the output variable as a manipulated variable for controlling the primary peak current; and simulating a formal dependency existing in the flyback converter between the input and output voltages and the primary peak current of the flyback converter by dimensioning the three constants.

In accordance with another mode of the invention, there is provided a method which comprises setting the first constant equivalent to a turns ratio of a transformer used in the flyback converter and setting the second constant equal to 1.

In accordance with a further mode of the invention, there is provided a method which comprises providing the third constant as a further input variable.

With the objects of the invention in view, there is also provided a circuit for limiting the output current of a power supply with a self oscillating flyback converter, by controlling a primary peak current as a function of input and output voltages of the flyback converter, comprising an analog calculating circuit for controlling the primary current.

In accordance with another feature of the invention, the analog calculating circuit includes two transistors having interconnected emitters and being connected as a differential amplifier circuit, one of the two transistors of the differential amplifier circuit having a collector connected to a first voltage referred to ground providing the input voltage of the flyback converter, and a base, a first drive circuit having an output connected to the base of the one transistor of the differential amplifier circuit, the other of the two transistors of the differential amplifier circuit having a base and a collector, a second drive circuit having an output connected to the base of the other transistor of the differential amplifier circuit, a diode connected to the collector of the other transistor of the differential amplifier circuit and polarized in the conducting direction, another transistor connected as a current sink circuit having a base-to-emitter path with a base connected to the diode for receiving current, an emitter connected to ground, and a collector connected to the interconnected emitters of the two transistors of the differential amplifier circuit, and a further transistor connected as a current sink having a base-to-emitter path parallel to the base-to-emitter path of the other transistor and a collector current providing a manipulated variable for controlling the primary peak current of the flyback converter; the first drive circuit including an additional transistor having a collector connected to ground, a base and an emitter, a current source connected between the emitter of the additional transistor and the first voltage and forming the output of the first trigger circuit, and another diode polarized in the conducting direction and connected between the base of the additional transistor and ground, a resistor with a given resistance connected between the base of the additional transistor and a second voltage referred to ground providing the output voltage of the flyback converter, another resistor having the given resistance connected to the base of the additional transistor, a reference voltage source having an output connected to the other resistor; the second drive circuit including an added transistor having a collector connected to ground, an emitter and a base, another current source connected between the emitter of the added transistor and the first voltage and forming the output of the second drive circuit, a further diode polarized in the conducting direction and connected between the base of the added transistor and ground, a further resistor connected between the base of the added transistor and the first voltage, an additional resistor having the same resistance as the further resistor connected between the base of the added transistor and the output of the reference voltage source; and the reference voltage source including a node forming the output of the reference voltage source, two diodes polarized in the conducting direction and interconnected in series between the node and ground, and an additional current source connected between the node and the first voltage.

In accordance with a concomitant feature of the invention, the resistance of the two resistors connected to the added transistor of the second drive circuit behaves with respect to the resistance of the two resistors connected to the additional transistor of the first drive circuit like a turns ratio of a transformer used in the flyback converter.

The invention has the advantage of maintaining the output current of a self oscillating flyback converter at a defined value by means of a single regulating means, taking into account the manner of functioning of such a flyback converter in all operating states. As a result, adequate current limitation is provided even in the case of short-circuiting. Furthermore, in the performance of the above-described method and circuit, less expenditure for circuitry is required than in prior art regulating means.

Other features which are considered as characteristic for the invention are set forth in the appended claims.

Although the invention is illustrated and described herein as embodied in a method for limiting the output current of a power supply and a circuit for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a schematic circuit diagram of an exemplary embodiment of an analog calculating circuit.

Referring now in detail to the single figure of the drawing, there is seen an n-p-n transistor pair $T_5$, $T_6$ operated as a differential amplifier circuit, with interconnected emitters connected to the collector of another n-p-n transistor $T_2$ and collector currents $I_3$ and $I_4$. The emitter of the transistor $T_2$ is connected to ground (represented in the drawing by an inverted T) and the base thereof is connected through a diode $D_4$, which is polarized in the conducting direction, to the collector of the other transistor $T_5$ of the differential amplifier circuit provided for feeding in current. The one transistor $T_6$ of the differential amplifier circuit, which has a collector supplied by a first voltage $U_1$ that is positive with respect to ground, is connected to the output of a first drive circuit. The first drive circuit includes a current source $Q_3$, which connects the base of the transistor $T_6$ to the first voltage $U_1$, an additional n-p-n transistor $T_4$, which has a collector connected to ground and an emitter connected to the current source $Q_3$, and another n-p-n transistor $D_5$ which is connected as a diode and is disposed in the conducting direction between the base and the collector of the transistor $T_4$. The base of the transistor $T_4$ is also applied through a resistor $R_{21}$ to a voltage $U_2$ that is positive with respect to ground. The input variable of the first drive circuit is a currernt $I_2$, which is formed of the partial currents flowing through the resistor $R_{21}$ and another resistor $R_{22}$. The base of the transistor $T_5$ is likewise connected to the output of a second drive circuit including another current source $Q_2$, which connects the base of the transistor $T_5$ to the first voltage $U_1$, an added p-n-p transistor $T_1$ which has a collector connected to ground and an emitter connected to the current source $Q_2$, and a further n-p-n transistor $D_3$ which is connected as a diode and is disposed in the conducting direction between the collector and the base of the transistor $T_1$. The input variable of the second drive circuit is a current $I_1$, which is formed of the partial currents flowing through a further resistor $R_{11}$ and an additional resistor $R_{12}$. Moreover, the exemplary embodiment shown also includes a reference voltage source, including an additional current source $Q_1$ that supplies the first voltge $U_1$ to two n-p-n transistors $D_1$ and $D_2$ connected as diodes and disposed serially in the conducting direction. The emitter of the transistor $D_1$ is connected to ground. The resistor $R_{12}$ leads from a node connected to the the collector of the transistor $D_2$ and forming the output of the reference voltage source, to the base of the transistor $T_1$ and the resistor $R_{22}$ leads from the collector of the transistor $D_2$ to the base of the transistor $T_4$. The input variables of the circuit configuration shown form the first and second voltages $U_1$ and $U_2$ as well as the collector current $I_3$ of the transistor $T_5$, while the output or manipulated variable is defined by the collector current $I_5$ of a further n-p-n transistor $T_3$ which is connected as a current sink and has a base-to-emitter path which is parallel to that of the transistor $T_2$.

Since the basic structure of the circuit configuration shown in the drawing has been explained, the mode of operation thereof will be described in further detail.

The exemplary embodiment shown can be essentially divided into four function blocks: a reference voltage source having the current source $Q_1$ and the transistor $D_1$ and $D_2$, a differential amplifier stage having the transistors $T_5$ and $T_6$ as well as the transistors $T_2$ and $T_3$ and the diode $D_4$, and two identically constructed logarithmic stages, including a current source $Q_2$, $Q_3$, a transistor $T_1$, $T_4$ and a transistor $D_3D_5$, connected as a diode. The differential amplifier stage is constructed in such a way that the ratio of the collector currents $I_3$ and $I_4$ of the transistors $T_5$ and $T_6$ is equal to the exponential difference between the base voltages thereof. Based on the logarithmic driving of the differential amplifier stage, the following dependency accordingly results: The input currents $I_1$ and $I_2$ of the logarithmic stages behave with respect to one another like the associated collector currents $I_3$ and $I_4$ of the differential amplifier stage. With suitable selection of the transistors $T_2$ and $T_3$, identical collector currents result for both transistors because of the identical triggering. The current $I_5$ is thus equivalent to the sum of both currents $I_3$ and $I_4$. Finally, with suitable dimensioning of the reference voltage source for the case where the resistors $R_{11}$ and $R_{12}$ and the resistors $R_{21}$ and $R_{22}$ have equal resistances, the resultant relationships are that the current $I_1$ is equal to the quotient of the first voltage $U_1$, which at the same time represents the supply voltage of the circuit configuration, and the resistor $R_{11}$, and that the current $I_2$ is equal to the quotient of the second voltage $U_2$ and the resistor $R_{21}$. The result for the entire circuit configuration is the following relationship:

$$I_5 = I_3 \cdot (1 + R_{11}/R_{21} \cdot U_2/U_1) = I_3 \cdot (1 + R_{12}/R_{22} \cdot U_2/U_1) \quad (2)$$

By comparison, converting equation (1), the following relationship is obtained:

$$I_P = 2I_A/\ddot{u} \cdot (1 + u \cdot U_A/U_E) \quad (3)$$

This equation describes how, in a self oscillating flyback converter in the overload range, the primary peak current $I_P$ must be controlled as a function of the input voltage $U_E$, the output voltage $U_A$ and the turns ratio u, in order to establish a defined output current $I_A$.

Based on the method according to the invention as described above, the basic form of the method is expressed as a formula in equation (4) as follows:

$$I_5 = K_3 \cdot (K_2 + K_1 \cdot U_2 / U_1) \tag{4}$$

The exemplary embodiment shows the invention further developed in such a way that the mode of functioning of the circuit configuration is adapted to the form used in equation (3). To this end, a first constant $K_1$ of the basic form is set equal to the turns ratio u of the transformer used in the flyback converter, and a second constant $K_2$ is set equal to 1. Furthermore, the input variables are selected in such a way that in forming the quotient, the analog calculating circuit divides the output voltage $U_A$ of the flyback converter by its input voltage $U_E$. The advantage in this case is that the output current of the flyback converter is defined solely through a third constant $K_3$. For the exemplary embodiment shown, this has the following significance: If the second voltage $U_2$ is set equal to the output voltage $U_A$, and the first voltage $U_E$ is set equal to the input voltage $U_E$, then with suitable dimensioning of the resistors $R_{11}$ and $R_{21}$, or $R_{12}$ and $R_{22}$, the current $I_5$, from which the primary current of the flyback converter required for a given output current dependent on the current $I_3$ is derived, is set. Suitably, the third constant is used as a further input variable, so that the output current of the flyback converter is advantageously settable from outside. In the present case, this is effected by externally imposing the current $I_3$.

In closing, it should also be noted that because of the low expenditure for circuitry, the circuit configuration shown is highly suitable particularly for being jointly integrated into further integrated components used for operating the flyback converter.

It should also be noted that additional possible embodiments are attainable by converting equation (2) and defining the three constants of the basic form accordingly.

I claim:

1. Method for limiting the output current of a power supply with a self oscillating flyback converter, by controlling a primary peak current as a function of input and output voltages of the flyback converter, which comprises forming a quotient from two given input variables and multiplying the quotient by a first constant, adding a second constant thereto and then multiplying by a third constant; defining the two input variables by the input and output voltage of the flyback converter; dividing the output voltage of the flyback converter by the input voltage of the flyback converter in the quotient formation; providing the output variable as a manipulated variable for regulating the primary peak current; and simulating a formal dependency existing in the flyback converter between the input and output voltages and the primary peak current of the flyback converter by dimensioning the three constants.

2. Method according to claim 1, which comprises setting the first constant equivalent to a turns ratio of a transformer used in the flyback converter and setting the second constant equal to 1.

3. Method according to claim 1, which comprises providing the third constant as a further input variable.

4. Circuit for limiting the output current of a power supply with a self oscillating flyback converter, by controlling a primary peak current as a function of input and output voltages of the flyback converter, comprising an analog calculating circuit for controlling the primary current, said analog calculating circuit including a divider stage with given amplification over which the input and output voltages of the flyback converter are applied, a multiplier stage receiving an output signal of said divider stage and an input value, and an adding stage receiving an output signal of said multiplier stage and the input value.

5. Circuit according to claim 4, wherein said analog calculating circuit includes two transistors having interconnected emitters and being connected as a differential amplifier circuit, one of said two transistors of said differential amplifier circuit having a collector connected to a first voltage referred to ground providing the input voltage of the flyback converter, and a base, a first drive circuit having an output connected to the base of said one transistor of said differential amplifier circuit, the other of said two transistors of said differential amplifier circuit having a base and a collector, a second drive circuit having an output connected to the base of said other transistor of said differential amplifier circuit, a diode connected to the collector of said other transistor of said differential amplifier circuit and polarized in the conducting direction, another transistor connected as a current sink circuit having a base-to-emitter path with a base connected to said diode for receiving current, an emitter connected to ground, and a collector connected to the interconnected emitters of said two transistors of said differential amplifier circuit, and a further transistor connected as a current sink having a base-to-emitter path parallel to the base-to-emitter path of said other transistor and a collector current providing a manipulated variable for controlling the primary peak current of the flyback converter; said first drive circuit including an additional transistor having a collector connected to ground, a base and an emitter, a current source connected between the emitter of said additional transistor and the first voltage and forming said output of said first trigger circuit, and another diode polarized in the conducting direction and connected between the base of said additional transistor and ground, a resistor with a given resistance connected between the base of said additional transistor and a second voltage referred to ground providing the output voltage of the flyback converter, another resistor having the given resistance connected to the base of said additional transistor, a reference voltage source having an output connected to said other resistor; said second drive circuit including an added transistor having a collector connected to ground, an emitter and a base, another current source connected between the emitter of said added transistor and the first voltage and forming said output of said second drive circuit, a further diode polarized in the conducting direction and connected between the base of said added transistor and ground, a further resistor connected between the base of said added transistor and the first voltage, an additional resistor having the same resistance as said further resistor connected between the base of said added transistor and said output of said reference voltage source; and said reference voltage source including a node forming said output of said reference voltage source, two diodes polarized in the conducting direction and interconnected in series between said node and ground, and an additional current source connected between said node and the first voltage.

6. Circuit according to claim 5, wherein the resistance of said two resistors connected to said added transistor of said second drive circuit behaves with respect to the resistance of said two resistors connected to said additional transistor of said first trigger circuit like a turns ratio of a transformer used in the flyback converter.

* * * * *